United States Patent Office 3,842,069
Patented Oct. 15, 1974

3,842,069
4''-DEOXY-4''-OXOERYTHROMYCIN
B DERIVATIVES
Peter Hadley Jones, Lake Forest, Jerry Roy Martin, Waukegan, James Bruce McAlpine, Libertyville, Jeanne Marie Pauvlik, Waukegan, and John Soloman Tadanier, Chicago, Ill., assignors to Abbott Laboratories, North Chicago, Ill.
No Drawing. Filed June 21, 1973, Ser. No. 372,387
Int. Cl. C07c 129/18
U.S. Cl. 260—210 E          5 Claims

ABSTRACT OF THE DISCLOSURE

Covers a 4''-deoxy-4''-oxoerythromycin derivative having a formula selected from the group consisting of:

Formula I

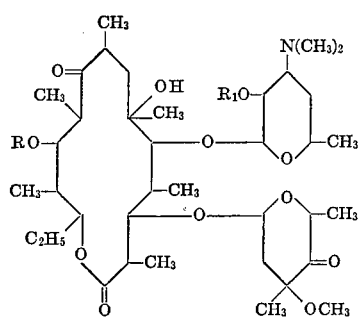

where R is —$CHR_2SR_3$, $R_2$ is hydrogen or loweralkyl, $R_3$ is loweralkyl, and $R_1$ is hydrogen or loweralkanoyl and;

Formula II

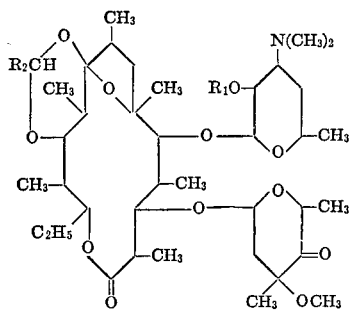

where $R_1$ and $R_2$ are as before defined. Said derivatives are useful as antibiotics or intermediates in preparing other useful antibiotic compounds.

DESCRIPTION OF THE INVENTION

This invention relates to 4''-deoxy-4''-oxoerythromycin B derivatives which are useful as antibiotics or as intermediates in preparing other useful antibiotic compounds.

Erythromycin is produced in two forms denoted A and B by cultivating a strain of Streptomyces erythreus in a suitable nutrient medium as is taught in U.S. 2,653,899, Bunch, et al. The structure of erythromycin is represented by the following formula:

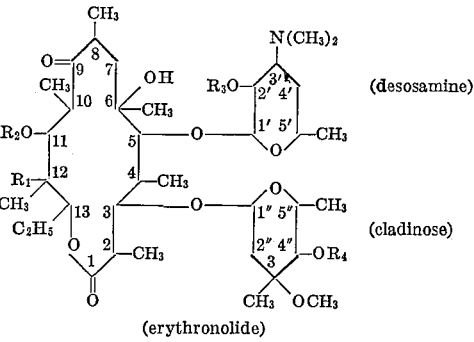

In this formula, when $R_2$, $R_3$ and $R_4$ represent hydrogen and $R_1$ represents hydroxyl, the structure illustrated is erythromycin A. When $R_1$ is, however, also hydrogen, the structure of erythromycin B is illustrated.

Erythromycin, as will be noted from the formula, comprises three cyclic fragments. These fragments are referred to respectively as cladinose, desosamine and erythronolide. The positions on the cladinose ring are indicated by double primed numbers; the positions on the desosamine ring by single primed numbers; while positions on the erythronolide ring are indicated by unprimed numbers.

In order to prepare the erythromycin derivatives here one may start with either erythromycin B or 2' alkanoyl erythromycin B. One of these derivatives is then treated with a dialkylsulfoxide in the presence of an acid anhydride to produce the 2'-alkanoyl-4''-deoxy-11-O-α-dialkylsulfide-4''-oxoerythromycin B. This compound in turn is reacted with a loweralkyl alcohol to produce the 4''-deoxy-11-O-α-dialkylsulfide-4''-oxoerythromycin B. The cyclic acetal derivative in turn is produced from the last-named compound by treating it with a combination of mercuric chloride and mercuric oxide. Lastly, the 4''-deoxy-4''-oxoerythromycin B is prepared from the cyclic acetal by treating the cyclic acetal with dilute hydrochloric acid. Alternatively the 4''-deoxy-4''-oxoerythromycin B is prepared from the 4''-deoxy-11-O-α-dialkylsulfide-4''-oxoerythromycin B by treatment of this compound with chloramine T in aqueous methanol.

The following examples illustrates fully the preparation of the derivatives of the invention:

EXAMPLE I

2'-Acetyl-4''-deoxy-11-methylthiomethyl-4''-oxoerythromycin B

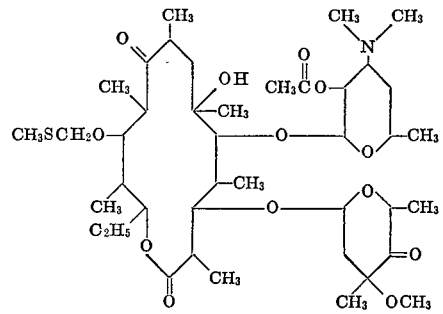

Erythromycin B (2.0 g., 2.8 mmoles) was combined with 20 ml. of dimthylsulfoxide and 14 ml. of acetic anhydride and allowed to stand overnight. The mixture was then poured into cold, 10% sodium carbonate and extracted three times with chloroform. The combined chloroform extracts were washed once with 5% sodium bicarbonate and once with water. After drying over sodium sulfate, solvent was removed to give 2.70 g. of crude product, shown by NMR and TLC to be the desired product.

EXAMPLE II

4″-Deoxy-11-methylthiomethyl-4″-oxoerythromycin B

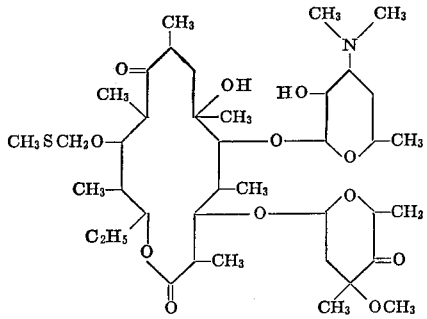

2′-Acetyl-4″-deoxy-11 - methylthiomethyl - 4″ - oxoerythromycin B from Example I was dissolved in 100 ml. of methanol. To this solution was added 50 ml. of 5% sodium bicarbonate, and the mixture was stirred for 24 hours. Some methanol was removed on the rotary evaporator, water was added to the mixture, and the mixture was extracted three times with chloroform. The combined chloroform extracts were washed with water, dried over sodium sulfate, and solvent was removed to give 2.32 g. of crude product, shown by NMR and TLC to be desired product.

Analysis is as follows:
Analysis.—Calculated for $C_{39}H_{69}NO_{12}S$. M.W.= 776.049; M.P.=167–173° C.

| Microanalysis: | Theory | Found |
|---|---|---|
| C | 60.36 | 60.53 |
| H | 8.96 | 9.05 |
| N | 1.80 | 1.74 |
| O | 24.74 | 24.64 |
| S | 4.13 | 3.97 |

EXAMPLE III

4″-Deoxy-9,11-O-methylene-4″-oxoerythromycin B-6,9-hemiacetal

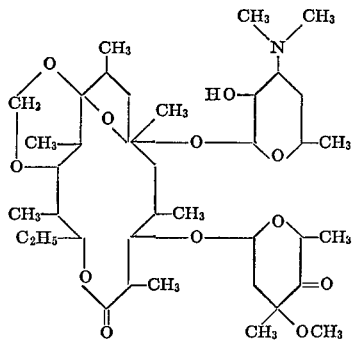

4″-Deoxy-11-methylthiomethyl-4″-oxoerythromycin B (1.0 g., 1.4 mmoles) was dissolved in a solution of 1.0 ml. of water and 30.0 ml. of acetone. When all of the 4″-deoxy-11-methylthiomethyl-4″-oxoerythromycin B had dissolved, 1.0 g. of mercuric oxide and 1.5 g. of mercuric chloride were added and the resulting mixture was stirred for four hours at room temperature. After stirring, the mixture was filtered through a celite mat and the volume was reduced to 30 ml. The filtrate was added to 50 ml. of water and was extracted with two half volumes of chloroform. The combined chloroform extracts were washed three times with half volumes of water and dried over anhydrous magnesium sulfate. The solvent was removed on the rotary evaporator to give 1.16 gm. of crude product.

The material was chromatographed on a column of silica gel (3.5 x 35 cm.) prepared in chloroform and made basic with triethylamine. The material was eluted from the column with chloroform containing 0.01% triethylamine. Fractions containing only the desired compound were collected and evaporated to dryness in vacuo to yield 309 mg. of product.

Analysis is as follows:
Analysis.—Calculated for $C_{38}H_{65}NO_{12}$. M.W.—727.94; M.P.=98–101° C.

| Microanalysis: | Theory | Found |
|---|---|---|
| C | 62.70 | 62.91 |
| H | 9.00 | 9.19 |
| N | 1.92 | 1.85 |
| O | 26.37 | 26.35 |

EXAMPLE IV

4″-Deoxy-4″-oxoerythromycin B

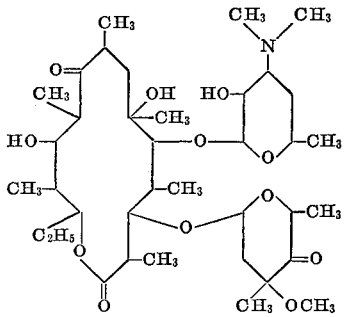

4″-Deoxy-9,11-O-methylene-4″-oxoerythromycin B–6, 9-hemiacetal (0.98 g., 1.3 mmoles) was dissolved in 50 ml. of methanol. To this solution was added 50 ml. of 0.02N HCl (HCl solution was added until pH 2 was obtained). After standing at room temperature for one hour, an excess of sodium bicarbonate was added and the solution was extracted three times with cholorform. The combined chloroform extracts were washed with water and dried over sodium sulfate. Solvent was removed to give 0.97 g. of product, which was chromatographed on a silica gel partition column to give 310 mg. (34%) of clean, white crystals (one spot on TLC).

Analysis is as follows:
Analysis.—Calculated for $C_{37}H_{65}NO_{12}$. M.W.= 715.931; M.P.=115–117° C.

| Microanalysis: | Theory | Found |
|---|---|---|
| C | 62.07 | 61.79 |
| H | 9.15 | 9.31 |
| N | 1.96 | 1.95 |
| O | 26.82 | 27.00 |

EXAMPLE V

4″-Deoxy-4″-oxoerythromycin B

In this procedure, the 4″-deoxy-4″-oxoerythromycin B compound was prepared directly from the compound of Example II. Specifically, 4″-deoxy-11-methylthiomethyl-4″-oxoerythromycin B (1.55 g.) in methanol:water (17.3, 20 ml.) was treated with a solution of chloramine T (1.25 g.) in methanol:water (17:3, 4 ml.). The mixture was allowed to stand at room temperature for 75 minutes, then poured into water (150 ml.) and extracted twice with benzene (150 ml. portions). The combined benzene extracts were washed twice with water (150 ml. portions) and extracted twice with 200 ml. portions of 0.1 N hydrochloric acid. The combined acid extracts were basified with ammonium hydroxide and extracted twice with methylene chloride (100 ml. portions). The combined methylene chloride extracts were concentrated to give, as crude product, a white froth (850 mg.).

A portion of the crude product was purified by preparative layer chromatography on "Merck Silica Gel HF 254"

plates developed with methanol, benzene, concentrated ammonium hydroxide (33 ml., 67 ml., 3 drops). The major band, as detected by U.V. light, was removed and extracted with cold methanol. The methanol extract was concentrated and the residue was digested in benzene. The benzene solution was filtered and concentrated to give 66 mg. of white froth whose NMR spectrum was identical with that of 4″-deoxy-4″-oxoerythromycin B as obtained in Example IV above.

The compounds were then tested for their activity against gram-positive and gram-negative bacteria in an agar dilution test. Results are given in MIC values (minimum inhibitory concentrations) expressed in micrograms/ml.

Results are as follows:

TABLE I

| Organism | MIC (in mcg./ml.) | | | |
|---|---|---|---|---|
| | Ex. I | Ex. II | Ex. III | Ex. IV |
| Staphylococcus aureus 9144 | 3.1 | 3.1 | 0.78 | 3.1 |
| Staphylococcus aureus Smith | 3.1 | 3.1 | 0.78 | 3.1 |
| Staphylococcus aureus Smith ER | >100 | >100 | >100 | >100 |
| Staphylococcus aureus Quinones | >100 | >100 | 100 | >100 |
| Staphylococcus aureus Wise 155 | >100 | >100 | 25 | >100 |
| Streptococcus faecalis 10541 | 0.39 | 0.78 | 0.39 | 0.78 |
| Escherichia coli Juhl | 1,000 | >1,000 | >1,000 | 1,000 |
| Klebsiella pneumoniae 10031 | 25 | 50 | 25 | 25 |
| Proteus vulgaris Abbott JJ | >1,000 | >1,000 | >1,000 | >1,000 |
| Proteus mirabilis Finland #9 | >1,000 | >1,000 | >1,000 | >1,000 |
| Salmonella typhimurium Ed #9 | 1,000 | >1,000 | >1,000 | 1,000 |
| Shigella sonnei 9290 | >100 | >100 | >100 | >100 |
| Pseudomonas aeruginosa BMH #10 | 1,000 | >1,000 | 1,000 | 1,000 |
| Streptococcus pyogenes Roper | >100 | >100 | 100 | >100 |
| Streptococcus pyogenes Scott | >100 | >100 | >100 | >100 |
| Haemophilus influenzae 9334 | 100 | 100 | >100 | 50 |
| Haemophilus influenzae Brimm | 50 | 50 | 100 | 25 |
| Haemophilus influenzae Illinois | 25 | 25 | 50 | 25 |
| Haemophilus influenzae Patterson | 50 | 100 | 100 | 50 |
| Haemophilus influenzae Shemwell | 50 | 100 | 100 | 50 |
| Haemophilus influenzae Terry | 50 | 100 | 100 | 25 |

We claim:

1. A 4″-deoxy-4″-oxoerythromycin compound selected from the group consisting of

Formula I

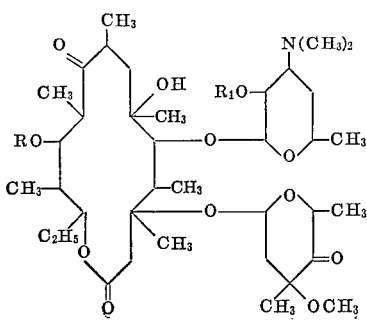

where R is —CHR₂SR₃ where R' is hydrogen or loweralkyl, R₃ is loweralkyl and R₁ is hydrogen or loweralkanoyl and;

Formula II

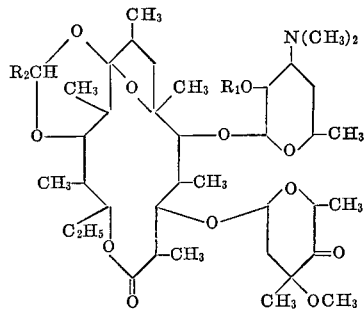

where R₁ and R₂ are as before defined.

2. The compound of Claim 1 wherein R is

CH₃SCH₂— and R₁ is

in Formula I.

3. The compound of Claim 1 wherein R is CH₃SCH₂ and R₁ is hydrogen in Formula I.

4. The compound of Claim 1 wherein R₁ is hydrogen in Formula II.

5. The compound of Claim 1 wherein R and R₁ are hydrogen in Formula I.

References Cited
UNITED STATES PATENTS 2,969,352  1/1961  Ruskin _____ 260—210 E
3,736,313  5/1973  Jones _____ 260—210 E JOHNNIE R. BROWN, Primary Examiner C. B. OWENS, Assistant Examiner U.S. Cl. X.R.
424—180

UNITED STATES PATENT OFFICE
CERTIFICATE OF CORRECTION

Patent No. 3,842,069        Dated October 15, 1974

Inventor(s) Peter Hadley Jones, Jerry Roy Martin, James Bruce McAlpine, Jeanne Marie Pauvlik, and John Soloman Tadanier It is certified that error appears in the above-identified patent and that said Letters Patent are hereby corrected as shown below:

In Column 6, line 1, delete "where R is —$CHR_2SR_3$ where R' is hydrogen or lower-" and substitute therefor:

--where R is —$CHR_2SR_3$ where $R_2$ is hydrogen or lower- --

Signed and sealed this 7th day of January 1975.

(SEAL)
Attest:

McCOY M. GIBSON JR.
Attesting Officer

C. MARSHALL DANN
Commissioner of Patents